P. ALTENFELD.
PROCESS OF MAKING ANIMAL FOOD.
APPLICATION FILED MAR. 5, 1913.
1,124,831.
Patented Jan. 12, 1915.
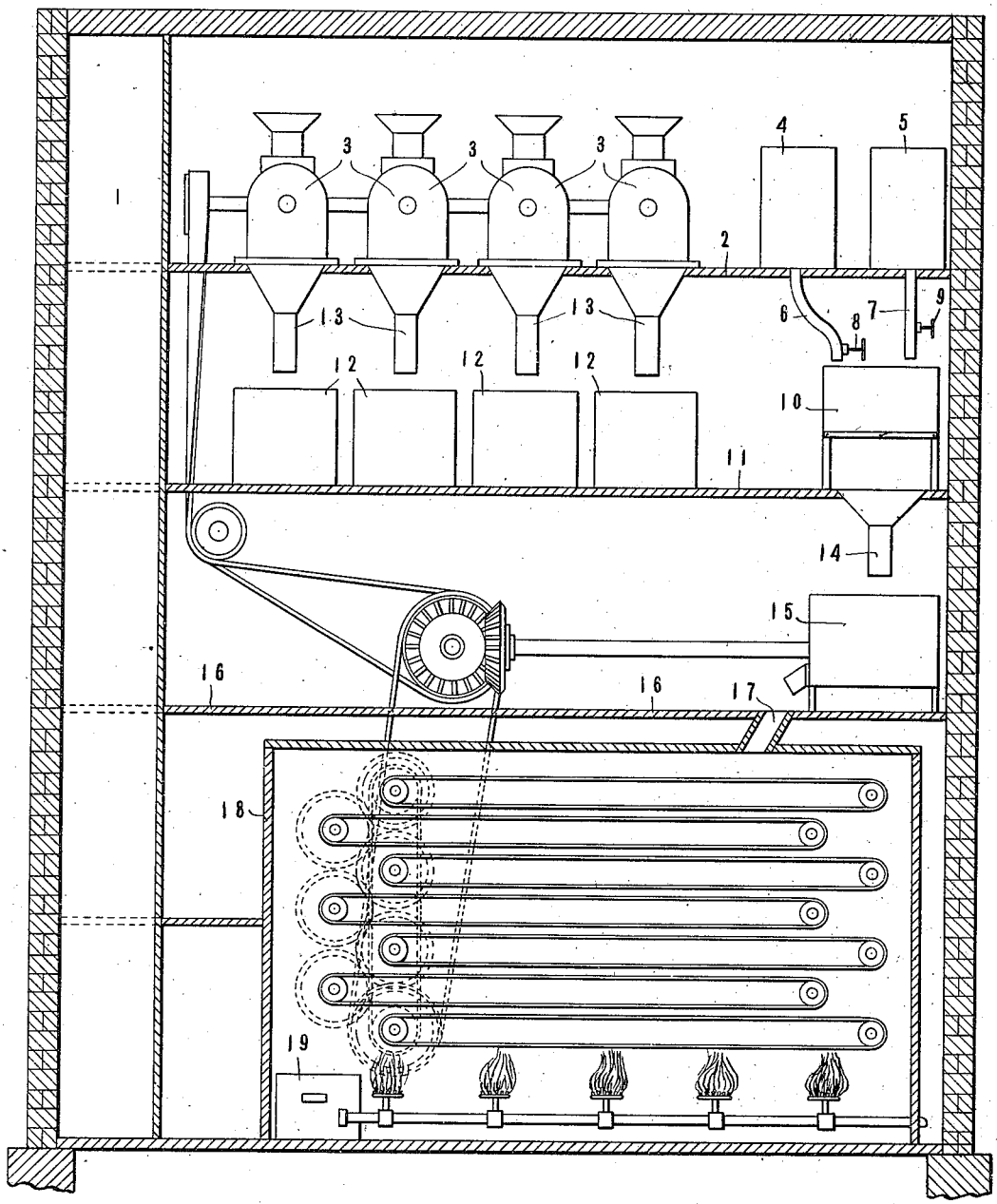
WITNESSES:
INVENTOR
ATTORNEY

UNITED STATES PATENT OFFICE.

PAUL ALTENFELD, OF NEW YORK, N. Y.

PROCESS OF MAKING ANIMAL FOOD.

1,124,831. Specification of Letters Patent. Patented Jan. 12, 1915.

Application filed March 5, 1913. Serial No. 752,035.

*To all whom it may concern:*

Be it known that I, PAUL ALTENFELD, a citizen of the United States, residing at New York, in the county of New York and State of New York, have invented certain new and useful Improvements in Processes of Making Animal Food, of which the following is a full, clear, and exact description, such as will enable others skilled in the art to which it appertains to make and use the same.

This invention relates to a process for producing food, and with respect to its more specific features, to a process for producing a food especially suitable for horses, cattle and the like.

One of the objects of the invention is the provision of a practical process by means of which nutritious substances, such as different grains, liquids, etc., may be treated and compounded so as to produce a product adapted for animal food.

Another object of the invention is the provision of an efficient and simple process for the production of an animal food which may be preserved at ordinary temperatures.

Other objects will be in part obvious and in part pointed out hereinafter.

The invention accordingly consists in the several steps and the relation and order of one or more of such steps with relation to each of the others thereof, which will be exemplified in the hereinafter disclosed process, and the scope of the application of which will be indicated in the claims that follow.

In the accompanying drawing is illustrated one of the various possible embodiments of an apparatus by means of which the herein-described process may be performed.

In the present process a quantity of different grains, such, for instance, as oats, wheat, rye, barley and malt, are separately ground and then mixed with water and yeast so as to produce a dough. The dough having been formed, it is permitted to ferment about four hours. After said fermentation, ground corn and oil-meal and also a quantity of molasses are added to the fermented mass and thoroughly mixed therewith to produce what may be termed a second or modified dough of medium hardness, and then this second or modified dough is allowed to ferment for a period of about twenty minutes. The oil-meal above referred to is preferably that produced by grinding flaxseed or linseed. The second fermentation referred to having been effected, the dough mass is divided into small pieces or particles and the particles then dried, preferably by heating the same for a period of about twenty-five minutes at a temperature sufficiently high to sterilize the product, said temperature ranging from 168° F., to 350° F., care being taken not to employ a temperature sufficiently high to burn the product. In accordance with the temperature employed, the time required for drying and sterilizing will vary, and it has been found that drying for a period of twenty-five minutes at a temperature of 350° F. is satisfactory and efficient. The product resulting from the process just described is then ready for consumption by animals and may be dispensed either loose or in packages. Said product will not get moist nor musty when exposed to the ordinary temperature and may be preserved for a long time. It is richer in nutritive value than the foods heretofore in use; it is predigested so that it will be easily assimilated; and as it is sterilized, it will be free from bacteria and other elements which cause colic and other ailments.

While the process above described may be carried out without the aid of any particular form of apparatus, said process lends itself readily to the use of automatic machinery for performing some, or all, of the steps thereof, and, by way of illustration, in the drawing is represented a section of a five-story building disclosing the different floors and the relation of apparatus which may be used to perform the different operations.

The numeral 1 indicates a vertical shaft in which operates a freight elevator, by means of which the materials may be lifted to the top floor 2 of the building.

The numerals 3 represent grinding mills, of such construction as to efficiently grind such grains as corn, wheat, oats, barley, etc., it being understood that there will be a separate grinding mill for each character of grain employed. Also on the floor 2 are tanks 4 and 5, one to supply water and the other to supply molasses, said tanks having discharge spouts 6 and 7, respectively, provided with cut-off or valves 8 and 9, disposed above a dough mixer 10, of such suitable construction and size as to efficiently mix ground grains with water and yeast and permit efficient fermentation of the mixture.

The dough mixer 10 is located upon the fourth floor 11, and a series of bins 12 are also located upon said fourth floor, into which bins the grains from the grinding mills may be conducted by means of chutes 13, it being understood that there is a separate bin for each character of grain. The desired ground grains are taken from the bins 12 and placed in the mixer 10, water and yeast are added to the grains in said mixer, and, by the operation of the mixer, the mass is converted into a dough. The mixing having been completed, the mass is allowed to ferment in the mixer for a comparatively long time, about four hours being sufficient, and after the fermentation has been completed, ground corn and oilmeal are added to the dough mass in said mixer and also a quantity of molasses from the tank 5. The mixer 10 is then again set in operation and the first dough mass therein mixed with the added elements specified until the mass shall have assumed a relatively hard consistency. After the completion of the second mixing, the new dough mass is allowed to ferment in the mixer for a period of about twenty minutes. After the second fermentation, the dough mass is discharged through the bottom of the mixer into a chute 14, whereby it is conducted to a dividing machine 15, which may be of any suitable form capable of efficiently operating to divide the dough mass into particles, preferably small particles.

The dividing machine is located upon the third floor 16 and the fragmentary product from the dividing machine is led by a chute 17 into the upper part of an oven 18, in which latter the particles are dried and sterilized. Said oven may be of any approved type suitable for the purpose, but preferably includes a series of superposed apron conveyers or endless belts, the upper plies of which move in opposite directions and are so related to each other that the material from the dividing machine falling upon the uppermost ply travels in one direction therewith and falls onto the next belt which carries the material in the opposite direction, and so on, there being a sufficient number of belts or conveyers to cause the material to be of the proper dryness by the time it has reached the receptacle 19, into which it is delivered by the lowermost conveyer. The oven may be heated by gas, steam or otherwise, and the temperature therein is preferably maintained at 350° F., although a lower temperature may be employed, but preferably not less than 168° F.

By the above described process a food is produced which is highly nutritious and well liked by such animals as horses and cattle, and which has many other desirable qualities, some of which have been hereinbefore mentioned.

As many changes could be made in carrying out the above process without departing from the scope of the invention, it is intended that all matter contained in the above description shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. The herein described process of producing animal food consisting in mixing a quantity of ground grain with water and yeast to form a dough, and permitting the same to ferment, a comparatively long time, then adding a further quantity of ground grain and also a quantity of molasses to said dough and again permitting the same to ferment a comparatively short time, then dividing the dough into small particles, and then drying said particles.

2. The herein described process of producing animal food consisting in mixing a quantity of ground grain with water and yeast to form a dough and permitting the same to ferment about four hours, then adding a further quantity of ground grain and also a quantity of molasses to said dough and again permitting the same to ferment about twenty minutes, then dividing the dough into small particles, and then drying said particles at a temperature sufficiently high to sterilize the same.

3. The herein described process of producing animal food consisting in mixing a quantity of ground grain with water and yeast to form a dough and permitting the same to ferment about four hours, then adding a further quantity of ground grain and also a quantity of molasses to said dough and again permitting the same to ferment about twenty minutes, then dividing the dough into small particles, and then drying said particles.

4. The herein described process of producing animal food which consists in mixing ground oats, wheat, rye, barley and malt with water and yeast to form a dough and permitting the same to ferment about four hours, then adding oil-meal and corn-meal and molasses to said dough and again permitting the same to ferment about twenty minutes, then dividing the dough into small particles, and then drying said particles.

5. The herein described process of producing animal food which consists in mixing ground oats, wheat, rye, barley and malt with water and yeast to form a dough and permitting the same to ferment about four hours, then adding oil-meal and corn-meal and molasses to said dough and again permitting the same to ferment about twenty minutes, then dividing the dough into small particles, and then drying said particles, said mixture comprising approximately seventy-four per cent. of grain, eight per cent. of water, fifteen per cent. of molasses and three per cent. of yeast.

In testimony whereof I affix my signature, in the presence of two witnesses.

PAUL ALTENFELD.

Witnesses:
J. W. ANDERSON,
C. J. KULBERG.